(12) United States Patent
Yoshimura et al.

(10) Patent No.: US 9,880,015 B2
(45) Date of Patent: Jan. 30, 2018

(54) POWER TRANSFER SYSTEM AND POWER TRANSFER METHOD

(71) Applicant: MITSUBISHI ELECTRIC CORPORATION, Tokyo (JP)

(72) Inventors: Keito Yoshimura, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/311,144

(22) PCT Filed: Jul. 9, 2014

(86) PCT No.: PCT/JP2014/068306
§ 371 (c)(1),
(2) Date: Nov. 14, 2016

(87) PCT Pub. No.: WO2016/006057
PCT Pub. Date: Jan. 14, 2016

(65) Prior Publication Data
US 2017/0074671 A1    Mar. 16, 2017

(51) Int. Cl.
*G01C 21/26* (2006.01)
*B60L 11/18* (2006.01)
(Continued)

(52) U.S. Cl.
CPC ............ *G01C 21/3469* (2013.01); *B60L 3/00* (2013.01); *B60L 11/18* (2013.01); *B60L 11/1824* (2013.01);
(Continued)

(58) Field of Classification Search
CPC ..... G01C 21/3469; G01C 21/26; B60L 11/18; B60L 11/182; B60L 11/1824; Y02T 10/7005
(Continued)

(56) References Cited

U.S. PATENT DOCUMENTS

2012/0280653 A1* 11/2012 Prosser ............... B60L 11/1816
320/109
2012/0303259 A1* 11/2012 Prosser ................. H02J 7/0054
701/400
2016/0200208 A1*  7/2016 Faye ................... B60L 11/1824
320/109

FOREIGN PATENT DOCUMENTS

JP       2009-210345 A    9/2009
JP       2012-55038 A     3/2012
(Continued)

*Primary Examiner* — Tan Q Nguyen
(74) *Attorney, Agent, or Firm* — Birch, Stewart, Kolasch & Birch, LLP

(57) ABSTRACT

The present invention relates to a power transfer system and a power transfer method for efficiently transferring power between vehicles that travel in a group. The power transfer system according to the present invention is a power transfer system in a vehicle that can travel on power, the system including: an information obtaining unit that obtains possible driving distance information indicating a possible driving distance of each of vehicles that travel to a same destination; and a power transfer controller that controls, based on the possible driving distance information obtained by the information obtaining unit, transfer of power between a power-surplus vehicle with extra power and a power-shortage vehicle lacking in power so that the vehicles can reach a same charging station, the power-surplus vehicle and the power-shortage vehicle being included in the vehicles.

13 Claims, 12 Drawing Sheets

(51) Int. Cl.
 *G01C 21/34* (2006.01)
 *B60L 3/00* (2006.01)
 *G08G 1/0967* (2006.01)
 *H04W 4/02* (2009.01)
 *H04W 84/00* (2009.01)

(52) U.S. Cl.
 CPC ....... *B60L 11/1846* (2013.01); *B60L 11/1861* (2013.01); *G01C 21/26* (2013.01); *G08G 1/096716* (2013.01); *G08G 1/096741* (2013.01); *G08G 1/096791* (2013.01); *H04W 4/02* (2013.01); *H04W 84/005* (2013.01); *Y02T 10/7005* (2013.01); *Y02T 10/7088* (2013.01); *Y02T 90/161* (2013.01)

(58) Field of Classification Search
 USPC .................................................. 701/422, 400
 See application file for complete search history.

(56) References Cited

FOREIGN PATENT DOCUMENTS

| | | |
|---|---|---|
| JP | 2013-20346 A | 1/2013 |
| JP | 2013-90361 A | 5/2013 |
| JP | 2013-115873 A | 6/2013 |
| JP | 2013-143875 A | 7/2013 |
| JP | 5362930 B1 | 12/2013 |

* cited by examiner

F I G. 1
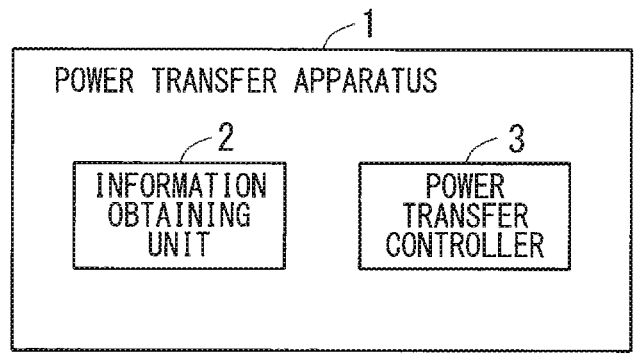

| VEHICLE | POSSIBLE DRIVING DISTANCE (Km) | CHARGING STATION SELECTED BY EACH VEHICLE | RECALCULATED POSSIBLE DRIVING DISTANCE (Km) | RESELECTED CHARGING STATION |
|---|---|---|---|---|
| A | 45 | CHARGING STATION 20 | 28.5 | CHARGING STATION 19 |
| B | 12 | CHARGING STATION 18 | 28.5 | CHARGING STATION 19 |

F I G . 1 4
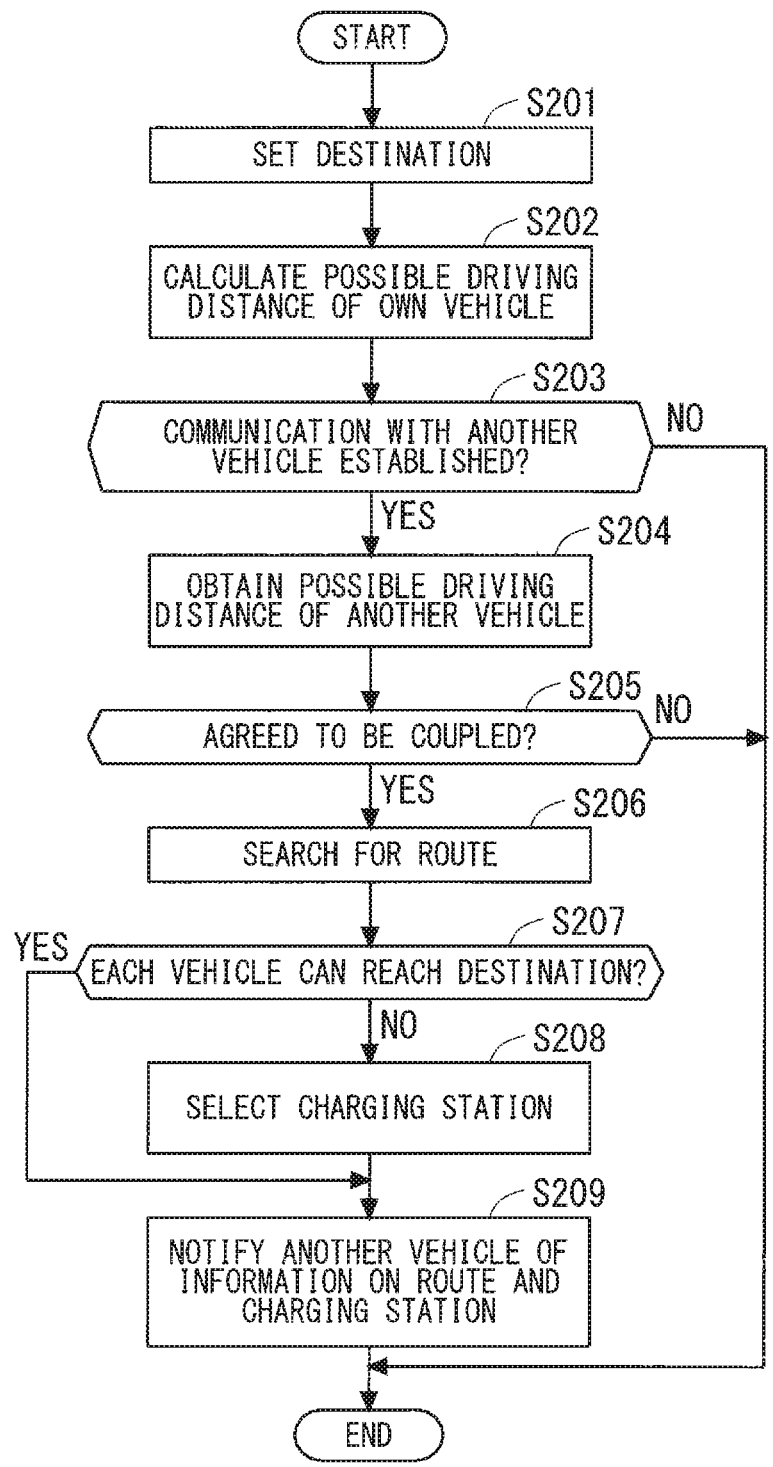

| VEHICLE | POSSIBLE DRIVING DISTANCE (Km) | CHARGING STATION DETERMINED BY EACH VEHICLE | SURPLUS POWER REPRESENTED BY DISTANCE (Km) | CHARGING STATION |
|---|---|---|---|---|
| A | 45 | CHARGING STATION 20 | 5 | CHARGING STATION 20 CHARGING STATION 18 |
| B | 12 | CHARGING STATION 18 | 2 | CHARGING STATION 18 |

POWER TRANSFER SYSTEM AND POWER TRANSFER METHOD

TECHNICAL FIELD

The present invention relates to a power transfer system and a power transfer method for transferring power between vehicles that travel to the same destination.

BACKGROUND ART

Conventionally, there have been techniques for supplying, among electric vehicles (EV) that travel in a platoon, power from a surplus-power vehicle with extra power to a power-shortage vehicle lacking in power. Here, the traveling in a platoon means that vehicles whose destinations are the same or different travel together along a common route. Vehicles may join or leave the platoon during their travel. Furthermore, the surplus-power vehicle with extra power means a vehicle having additional power other than the power necessary to travel up to a predetermined point, whereas the power-shortage vehicle lacking in power means a vehicle that does not have power necessary to travel up to a predetermined point.

Examples of the techniques include a disclosed technique for supplying power from a surplus-power vehicle to a power-shortage vehicle during their travel (see, for example, Patent Document 1). Further disclosed is a technique with which while maintaining power necessary to reach a charging station, a surplus-power vehicle supplies the remaining power to a power-shortage vehicle (see, for example, Patent Document 2). Here, the charging station means a facility that charges power into a battery included in an EV.

PRIOR-ART DOCUMENTS

Patent Documents

Patent Document 1: Japanese Unexamined Patent Application Publication No. 2013-143875
Patent Document 2: Japanese Unexamined Patent Application Publication No. 2013-20346

SUMMARY OF INVENTION

Problems to be Solved by the Invention

Patent Documents 1 and 2 are useful as techniques for preventing a vehicle from stalling due to power shortage during travel or for recovering from the stalling. However, Patent Documents 1 and 2 do not consider the case where vehicles travel in a group. Here, the traveling in a group means that vehicles travel together to the same destination.

If the vehicles travel in a group and are charged at the same charging station as much as possible, all the vehicles can reach the destination efficiently (without any loss in power or time).

Although charging stations are normally set to each of the vehicles in setting the destination, they are set again to each of the vehicles at regular intervals, depending on, for example, a traffic situation during travel.

In the normal setting according to the techniques of Patent Documents 1 and 2, charging stations are sometimes different for each of the vehicles, even when their destinations are the same. Here, the vehicles are charged at the respective charging stations, in order from a vehicle with less remaining amount of power. Thus, the efficiency in traveling in a group has been low because a vehicle that has not yet been charged has to travel ahead to the charging station set to the vehicle and again merge with the group after being charged, or has to be charged together with the other vehicles irrespective of the presence of the remaining power.

The present invention has been conceived to solve the problems, and relates to a power transfer system and a power transfer method for enabling vehicles that travel in a group to efficiently transfer power therebetween.

Means to Solve the Problems

In order to solve the problems, the power transfer system according to the present invention is a power transfer system in a vehicle that can travel on power, the system including: an information obtaining unit that obtains possible driving distance information indicating a possible driving distance of each of vehicles that travel to a same destination; a power transfer controller that controls, based on the possible driving distance information obtained by the information obtaining unit, transfer of power between a power-surplus vehicle with extra power and a power-shortage vehicle lacking in power so that the vehicles can reach a same charging station, the power-surplus vehicle and the power-shortage vehicle being included in the vehicles; and a charring station selecting unit that selects the same charging station, wherein the charging station selecting unit selects the same charging station, based on the possible driving distance information and a route to the destination, the information obtaining unit obtains charging station availability information indicating availabilities of charging stations, and the charging station selecting unit selects a charging station at which the vehicles can be simultaneously charged, based on the charging station availability information obtained by the information obtaining unit.

Furthermore, the power transfer method according to the present invention is a method for transferring power in a vehicle that can travel on power, the method including: obtaining possible driving distance information indicating a possible driving distance from each of vehicles that travel to a same destination; controlling, based on the obtained possible driving distance information, transfer of power between a power-surplus vehicle with extra power and a power-shortage vehicle lacking in power so that the vehicles can reach a same charging station, the power-surplus vehicle and the power-shortage vehicle being included in the vehicles; selecting the same charging station; and obtaining charging station availability information indicating availabilities of charging stations, wherein the selecting includes: selecting the same charging station, based on the possible driving distance information and a route to the destination; and selecting a charging station at which the vehicles can be simultaneously charged, based on the charging station availability information obtained in the obtaining of charging station availability information.

Effects of the Invention

The power transfer system according to the present invention is a power transfer system in a vehicle that can travel on power, the system including: an information obtaining unit that obtains possible driving distance information indicating a possible driving distance of each of vehicles that travel to a same destination; a power transfer controller that controls, based on the possible driving distance information obtained by the information obtaining unit, transfer of power between a power-surplus vehicle with extra power and a power-shortage vehicle lacking in power so that the vehicles can reach a same charging station, the power-surplus vehicle and the power-shortage vehicle being included in the vehicles; and a charging station selecting unit that selects the same charging station, wherein the charging station selecting unit selects the same charging station, based on the possible driving distance information and a route to the destination, the information obtaining unit obtains charging station availability information indicating availabilities of charging stations, and the charging station selecting unit selects a charging station at which the vehicles can be simultaneously charged, based on the charging station availability information obtained by the information obtaining unit. Thus, the power transfer system enables the vehicles that travel in a group to efficiently transfer power therebetween.

Furthermore, the power transfer method is a method for transferring power in a vehicle that can travel on power, the method including: obtaining possible driving distance information indicating a possible driving distance from each of vehicles that travel to a same destination; and controlling, based on the obtained possible driving distance information, transfer of power between a power-surplus vehicle with extra power and a power-shortage vehicle lacking in power so that the vehicles can reach a same charging station, the power-surplus vehicle and the power-shortage vehicle being included in the vehicles; selecting the same charging station; and obtaining charging station availability information indicating availabilities of charging stations, wherein the selecting includes: selecting the same charging station, based on the possible driving distance information and a route to the destination; and selecting a charging station at which the vehicles can be simultaneously charged, based on the charging station availability information obtained in the obtaining of charging station availability information. Thus, the power transfer method enables the vehicles that travel in a group to efficiently transfer power therebetween.

The object, features, aspects and advantages of the present invention will become more apparent from the following detailed description and the accompanying drawings of the present invention.

BRIEF DESCRIPTION OF DRAWINGS

FIG. 1 is a block diagram illustrating an example of a configuration of a power transfer apparatus according to Embodiment 1 of the present invention.

FIG. 14 is a flowchart illustrating an example of operations performed by a power transfer apparatus according to Embodiment 2 of the present invention.

DESCRIPTION OF EMBODIMENTS

Embodiments of the present invention will be hereinafter described based on the drawings.

[Premise Technique]

First, the technique on which the present invention is predicated (premise technique) will be described.

Figures 18, 19:
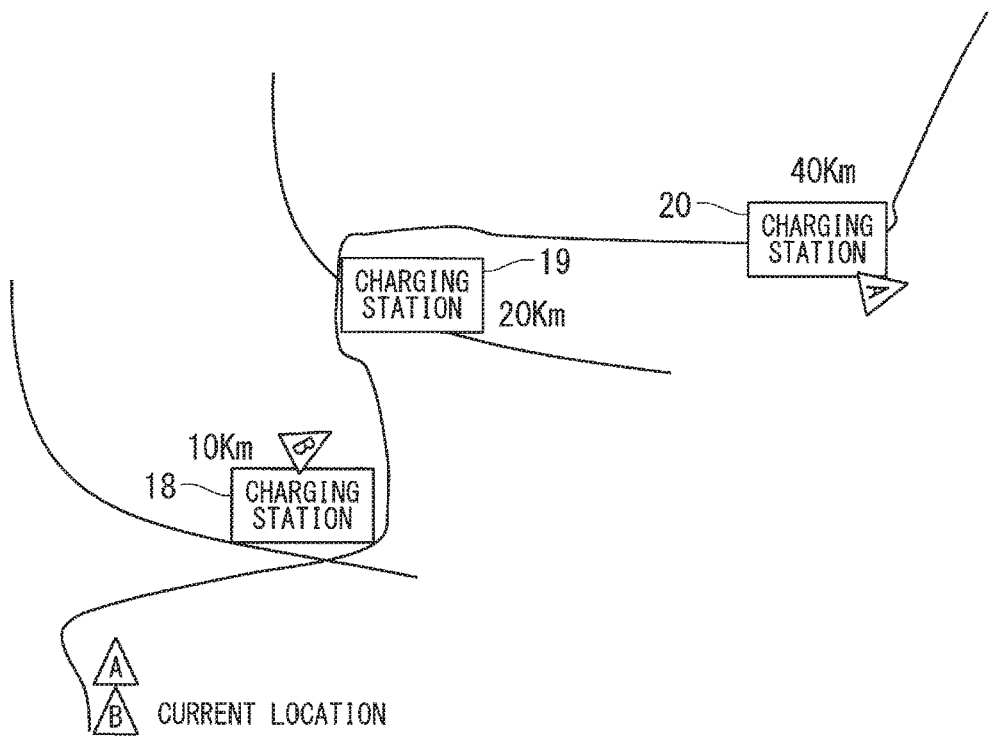
FIG. 18 illustrates a premise technique.
FIG. 19 illustrates a premise technique.

FIGS. 18 and 19 each illustrate a premise technique. Vehicles A and B that are EVs are at the same current location. Then, the vehicles A and B separately search for a route from the current location to the same destination and make respective plans for charging. After searching for the route, the vehicles A and B travel together to the destination along the route. Furthermore, the vehicles A and B are of the same vehicle model.

As illustrated in FIG. 19, the possible driving distance of the vehicle A is 45 km, and the possible driving distance of the vehicle B is 12 km. Here, the possible driving distance means a distance that can be traveled by each of the vehicles A and B from the current location.

The charging station at which the vehicle A is to be charged is a charging station 20 at it distance of 40 km from the current location. Furthermore, the charging station at which the vehicle B is to be charged is a charging station 18 at a distance of 10 km from the current location. The charging stations at which the vehicles A and B are to be charged are determined at the current location as described above. Furthermore, to reduce the number of charging times required to reach the destination as much as possible, generally, the charging stations are selected from a range including the possible driving distances of the vehicles A and B, and the charging stations to be selected are the closest to the destination.

The vehicle A has a surplus power to travel 5 km, and the vehicle B has a surplus power to travel 2 km. Here, the surplus power means the power remaining when the vehicles A and B arrive at the respective charging stations, and indicates how many km each of the vehicles A and B can travel on the surplus power.

The driver of the vehicle A determines whether to charge at the charging station 20 determined by the vehicle A or at the charging station 18 together with the vehicle B. However, when the vehicle A is charged at the charging station 20, the vehicle A needs to merge with the vehicle B again after being charged. When the vehicle A is charged at the charging station 18, the vehicle A is charged together with the vehicle B irrespective of the presence of the remaining power. Consequently, a problem in low efficiency occurs when the vehicles A and B travel together to the destination.

The present invention has been conceived to solve such a problem, and will be hereinafter described in detail.

Embodiment 1

First, a configuration of a power transfer system in a vehicle that can travel on power according to Embodiment 1 of the present invention will be described. Embodiment 1 and the following Embodiments each will describe a power transfer system implemented by a power transfer apparatus alone.

FIG. 1 is a block diagram illustrating an example of a configuration of a power transfer apparatus 1 according to Embodiment 1. FIG. 1 illustrates the minimum constituent elements necessary to construct the power transfer apparatus 1.

As illustrated in FIG. 1, the power transfer apparatus 1 includes at least an information obtaining unit 2 and a power transfer controller 3.

The information obtaining unit 2 obtains possible driving distance information indicating a possible driving distance of each of the vehicles that travel to the same destination. In the following description, the vehicles that can travel on power are EVs.

The power transfer controller 3 controls, based on each possible driving distance information obtained by the information obtaining unit 2, transfer of power between a power-surplus vehicle with extra power and a power-shortage vehicle lacking in power among vehicles so that the vehicles can reach the same charging station.

Next, another configuration of the power transfer apparatus 1 including the information obtaining unit 2 and the power transfer controller 3 will be described.

Figure 2:
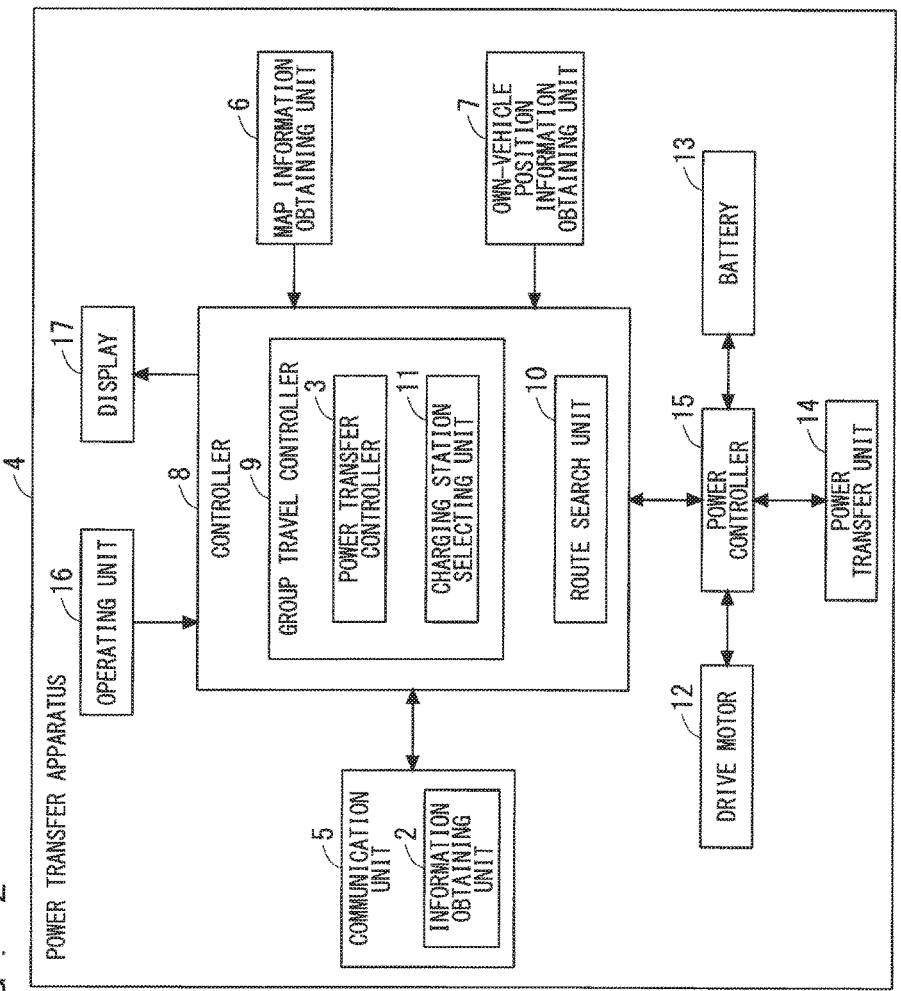
FIG. 2 is a block diagram illustrating another example of a configuration of a power transfer apparatus according to Embodiment 1 of the present invention.

FIG. 2 is a block diagram illustrating an example of a configuration of a power transfer apparatus 4.

As illustrated in FIG. 2, the power transfer apparatus 4 includes a communication unit 5, a map information obtaining unit 6, an own-vehicle position information obtaining unit 7, a controller 8, a drive motor 12, a battery 13, a power transfer unit 14, a power controller 15, an operating unit 16, and a display 17.

The communication unit 5 communicates with another vehicle or with an external server such as a charging management system. Furthermore, the communication unit 5 includes the information obtaining unit 2, and obtains, through the information obtaining unit 2, various pieces of information such as the possible driving distance information from another vehicle or an external server wirelessly or through wiring.

The map information obtaining unit 6 includes a storage, for example, a hard disk drive (HDD) and a semiconductor memory, and obtains and stores map information.

The map information obtaining unit 6 may externally obtain the map information. The map information obtaining unit 6 may obtain the map information, for example, by downloading it from an external server via a communication network. Alternatively, the map information obtaining unit 6 may obtain the map information by reading it from a storage medium such as a memory. In other words, the map information obtaining unit 6 has a function of obtaining the map information.

The own-vehicle position information obtaining unit 7 obtains information on a current position of the own vehicle. Specifically, the own-vehicle position information obtaining unit 7 obtains the position information on the own vehicle from, for example, a Global Positioning System (GPS) satellite.

The controller 8 includes a group travel controller 9 and a route search unit 10.

The group travel controller 9 controls traveling in a group, and includes the power transfer controller 3 and a charging station selecting unit 11. The power transfer controller 3 controls transfer of power to and from the other vehicles. Specifically, the power transfer controller 3 controls the power controller 15 to be described later. The charging station selecting unit 11 selects a charging station based on, for example, the possible driving distance information.

The route search unit 10 searches for a route from a current position (current location) of the own vehicle obtained by the own-vehicle information obtaining unit 7 to a destination set by the user through the operating unit 16 to be described later, based on the destination and the current location. Here, the route search unit 10 may search for a route using the map information obtained by the map information obtaining unit 6.

The drive motor 12 drives the own vehicle. The battery 13 stores power necessary to drive the drive motor 12.

The power transfer unit 14 is used when transferring power to and from the other vehicles or when receiving power at a charging station. Examples of the methods for transferring or receiving power include a method for connecting the own vehicle to another vehicle, through wiring using, for example, a cable, and wirelessly (in a non-contact manner). Furthermore, the power transfer unit 14 is desirably placed each at front and rear portions of the own vehicle, but may be placed at any portion.

The power controller 15 controls the drive motor 12, the battery 13 and the power transfer unit 14 under control of the power transfer controller 3.

The operating unit 16 receives an input operation by the user. Here, examples of the operating unit 16 include a touch panel, a hard key, and voice input (for example, a microphone). Various pieces of information, such as information on transfer of power are displayed on the display 17. The operating unit 16 and the display 17 may be integrated or separated.

Next, operations performed by the power transfer apparatus 4 will be described.

Figure 3:
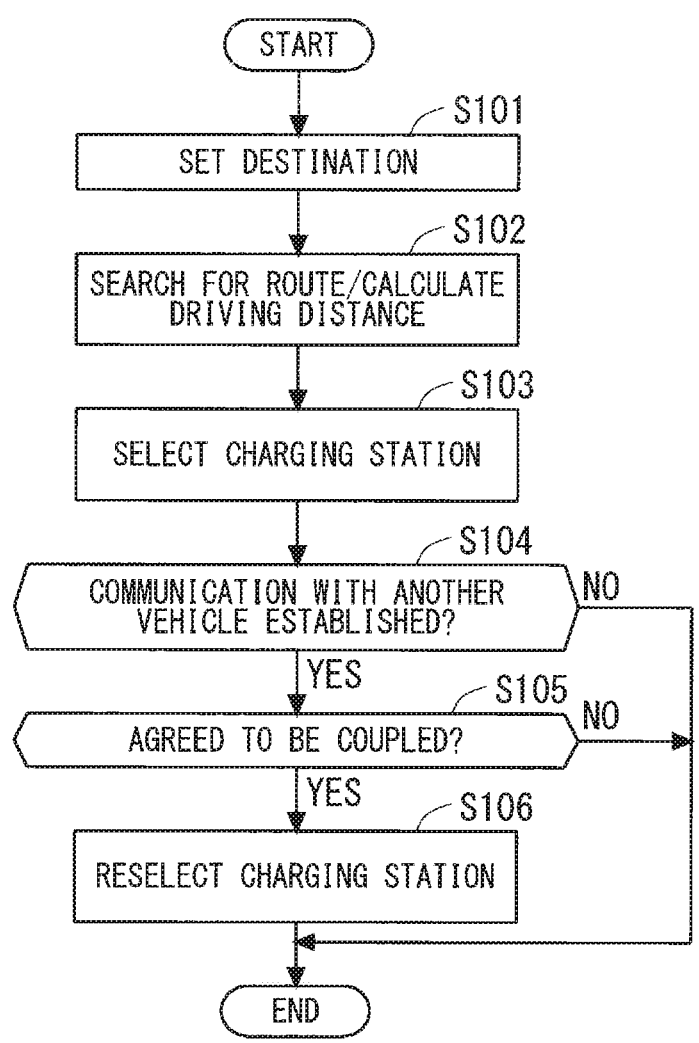
FIG. 3 is a flowchart illustrating an example of operations performed by the power transfer apparatus according to Embodiment 1 of the present invention.

FIG. 3 is a flowchart illustrating an example of the operations performed by the power transfer apparatus 4.

At a step S101, the user sets a destination through the operating unit 16.

At a step S102, the route search unit 10 searches for a route from the current position (current location) of the own vehicle obtained by the own-vehicle information obtaining unit 7 to the destination set by the user, based on the destination and the current location.

Furthermore, the group travel controller 9 calculates a possible driving distance from the current location along the route retrieved by the route search unit 10, based on the route and the remaining amount of power in the battery 13. The information on the remaining amount of power in the battery 13 is obtained from the battery 13 through the power controller 15 under control of the group travel controller 9.

At a step S103, the charging station selecting unit 11 selects a charging station based on the route retrieved by the route search unit 10 and the possible driving distance calculated by the group travel controller 9. The information on the charging station may be included in the map information stored in the map information obtaining unit 6 or obtained from an external server through the communication unit 5.

At a step S104, the group travel controller 9 determines, through the communication unit 5, whether communication with another vehicle has been established. When the group travel controller 9 determines that the communication with the other vehicle has been established, the processes proceed to a step S105. When the group travel controller 9 determines that the communication with the other vehicle has not been established, the processes end. Here, examples of the methods for establishing communication (namely, identifying another vehicle to be a communication partner) include a method for connecting the vehicles through wiring, a method for obtaining an ID of a subject vehicle via short-range communication, a method for obtaining a mobile phone number of a driver of the subject vehicle, and a method for obtaining information on an identification number of the number plate of the subject vehicle. The own vehicle previously stores the ID, the mobile phone number of the driver, and the identification number of the number plate of the subject vehicle.

At a step S105, the group travel controller 9 determines, through the communication unit 5, whether it was agreed to be coupled to the other vehicle. When the group travel controller 9 determines that it was agreed to be coupled to the other vehicle, the processes proceed to a step S106. When the group travel controller 9 determines that it is not agreed to be coupled to the other vehicle, the processes end. Here, agreeing to be coupled means agreeing to transfer power between the own vehicle and the other vehicle.

At the step S106, the charging station selecting unit 11 reselects a charging station. Specifically, the group travel controller 9 obtains information on the possible driving distance of the other vehicle from the other vehicle through the information obtaining unit 2. The group travel controller 9 recalculates a possible driving distance of the own vehicle and the other vehicle, based on the possible driving distances of the own vehicle and the other vehicle. The group travel controller 9 may obtain information on the electricity expense and the remaining amount of the battery of the other vehicle. Here, the group travel controller 9 can recalculate the possible driving distance with higher precision, based on the electricity expenses and the remaining amounts of the batteries of the own vehicle and the other vehicle.

Next, the charging station selecting unit 11 reselects a charging station at which the own vehicle and the other vehicle are to be charged, based on the possible driving distance of the own vehicle and the other vehicle.

Then, the power transfer controller 3 instructs the power controller 15 to supply power from the own vehicle to the other vehicle (or receive power for the own vehicle from the other vehicle) so that the own vehicle and the other vehicle can reach the reselected charging station (namely, can travel the recalculated possible driving distance). The own vehicle and the other vehicle transfer power to each other (namely, a power-surplus vehicle supplies power to a power-shortage vehicle) while they are traveling up to the charging station.

Next, the specific operations performed by the power transfer apparatus 4 will be described with reference to FIGS. 4 and 5.

Each of the vehicles A and B includes the power transfer apparatus 4 in FIG. 2 (particularly, the group travel controller 9), and performs the operations illustrated in FIG. 3. Furthermore, in the vehicles A and B, the route search unit 10 searches for a route from the current location to a predetermined destination. The vehicles A and B travel in a group from the current location to the same destination along the route. Furthermore, the vehicles A and B are of the same vehicle model.

Figures 4, 5:
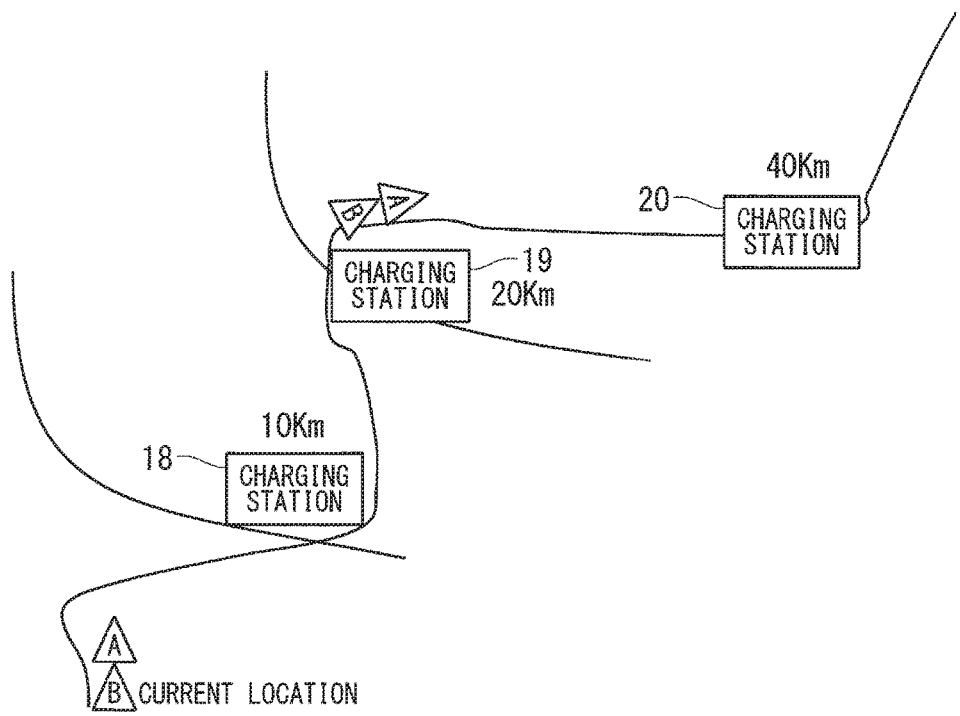
FIG. 4 illustrates the operations performed by the power transfer apparatus according to Embodiment 1 of the present invention.
FIG. 5 illustrates the operations performed by the power transfer apparatus according to Embodiment 1 of the present invention.

As illustrated in FIG. 5, the possible driving distance of the vehicle A is 45 km, and the possible driving distance of the vehicle B is 12 km.

The charging station selected by the vehicle A is the charging station 20 at a distance of 40 km from the current location. Furthermore, the charging station selected by the vehicle B is the charging station 18 at a distance of 10 km from the current location. The charging stations at which the vehicles A and B are to be charged are determined at the current location. Furthermore, to reduce the number of charging times required to reach the destination as much as possible, generally, the charging stations are selected from a range including the possible driving distances of the vehicles A and B, and the charging stations to be selected are the closest to the destination.

In the vehicle A, for example, the group travel controller 9 obtains information on the possible driving distance of the vehicle B from the vehicle B through the information obtaining unit 2, and recalculates a possible driving distance. The possible driving distance to be recalculated is desirably a long distance that both of the vehicles A and B can travel. In the example of FIG. 5, the group travel controller 9 recalculates the possible driving distance (28.5 km) so that the vehicles A and B can travel the same distance. Next, the charging station selecting unit 11 reselects a charging station (charging station 19) at which the vehicles A and B are to be charged, based on the possible driving distance recalculated by the group travel controller 9.

The vehicle B performs the same operations above. In other words, the charging station reselected by the vehicles A and B is the same (charging station 19). Then, the vehicle A supplies power to the vehicle B while the vehicles A and B are traveling up to the charging station 19.

The group travel controller 9, but not necessarily, recalculates the possible driving distance so that the vehicles A and B can travel the same distance. The group travel controller 9 may recalculate, as a possible driving distance, a distance (20 km in the examples of FIGS. 4 and 5) to a charging station as far as possible from the current location at which both of the vehicles A and B can be charged.

Next, display examples of the display 17 in each of the vehicles A and B will be described.

First, the display example of the display 17 in the vehicle A will be described with reference to FIGS. 6 to 9. FIGS. 6 to 9 illustrate a chronological transition of display states in the display 17. Furthermore, in FIG. 6, a route from the current location to a destination has been retrieved, and the charging station 20 at which the vehicle A is to be charged is selected.

Figure 6:
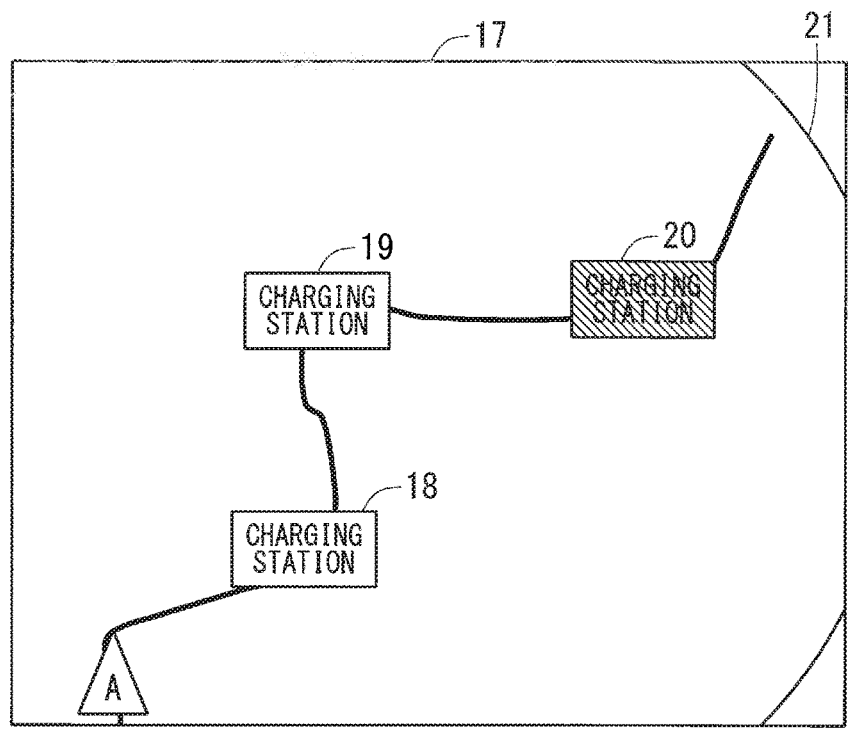
FIG. 6 illustrates a display example in the power transfer apparatus according to Embodiment 1 of the present invention.

As illustrated in FIG. 6, the charging stations 18 to 20 along the route to the destination are displayed on the display 17. The charging station 20 at which the vehicle A is to be charged is highlighted more prominently than the other charging stations 18 and 19. Here, the driver of the vehicle A can easily understand the charging station at which the own vehicle is to be charged. Furthermore, a possible driving range 21 of the vehicle A is displayed on the display 17. Here, the possible driving range is a range encircled with a radius of the possible driving distance.

Figure 7:
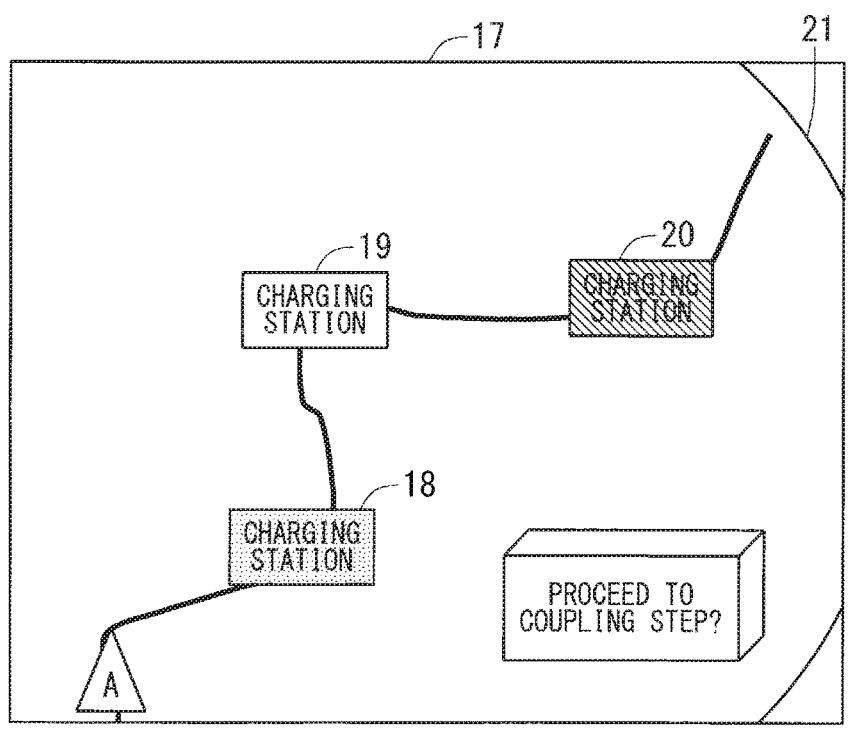
FIG. 7 illustrates a display example in the power transfer apparatus according to Embodiment 1 of the present invention.

Next, when establishing communication with the vehicle B in the display state of FIG. 6 (Yes at the step S104 in FIG. 3), the vehicle A obtains, from the vehicle B, information on the charging station at which the vehicle B is to be charged (charging station 18). Then, the charging station 18 at which the vehicle B is to be charged is highlighted as illustrated in FIG. 7. Here, the driver of the vehicle A can understand the charging station at which the vehicle B is to be charged.

Furthermore, a button indicating "PROCEED TO COUPLING STEP?" is displayed on the display 17 as illustrated in FIG. 7. Upon selection of the button, the display 17 transitions to the one in FIG. 8.

Figure 8:
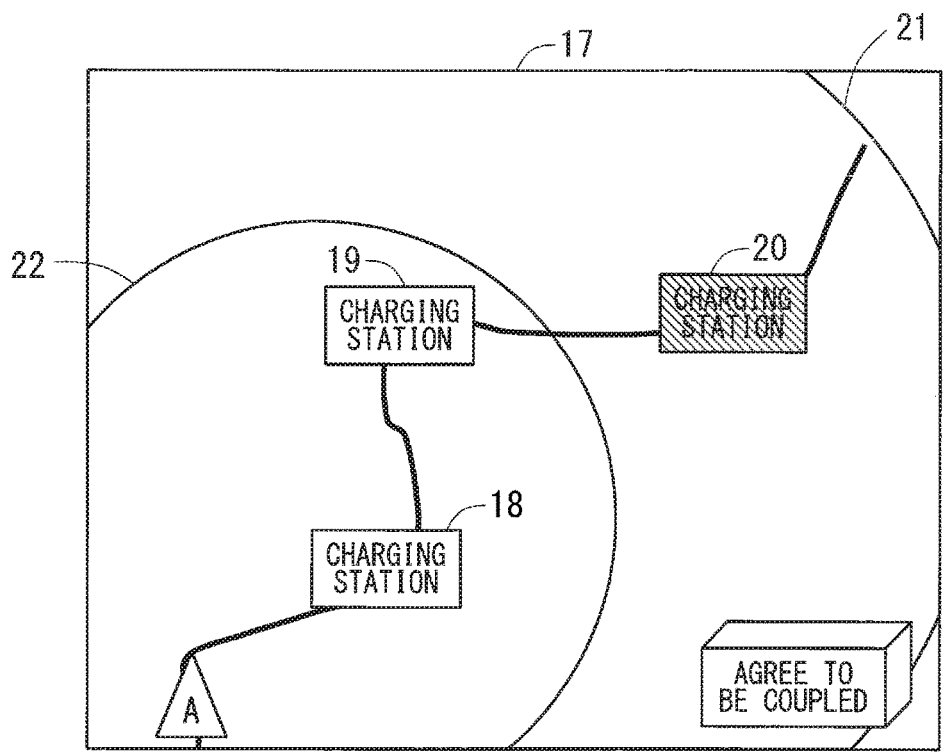
FIG. 8 illustrates a display example in the power transfer apparatus according to Embodiment 1 of the present invention.

As illustrated in FIG. 8, a possible driving range 22 in which both the vehicles A and B can travel as well as the possible driving range 21 of the vehicle A are displayed, and the charging station 20 at which the own vehicle (vehicle A) is to be charged is highlighted on the display 17. The possible driving range 22 is a range encircled with a radius of the possible driving distance of the vehicles A and B that has been recalculated by the group travel controller 9. Here, the vehicle A obtains, from the vehicle B, information on the possible driving distance of the vehicle B.

Furthermore, a button indicating "AGREE TO BE COUPLED" is displayed on the display 17. Upon selection of the button (Yes at the step S105 in FIG. 3), the display 17 transitions to the one in FIG. 9.

Figure 9:
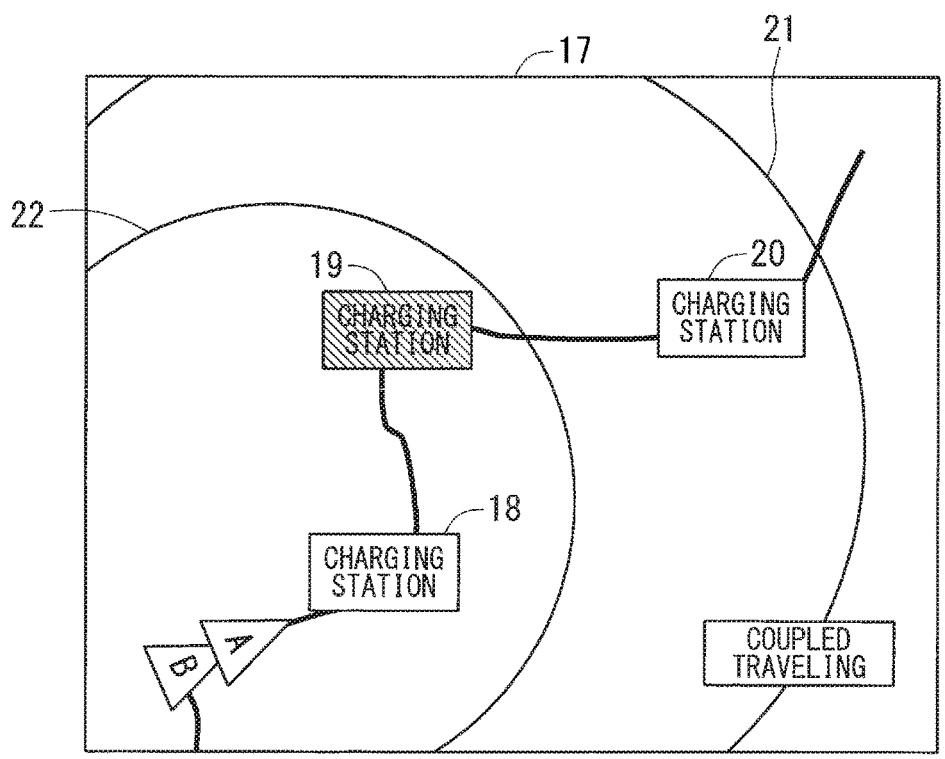
FIG. 9 illustrates a display example in the power transfer apparatus according to Embodiment 1 of the present invention.

As illustrated in FIG. 9, the charging station 19 reselected by the charging station selecting unit 11 is highlighted on the display 17. Furthermore, "COUPLED TRAVELING" indicating that the vehicles A and B transfer power to each other while they are traveling is displayed on the display 17.

Next, display examples of the display 17 in the vehicle B will be described with reference to FIGS. 10 to 13. FIGS. 10 to 13 illustrate a chronological transition of display states in the display 17. Furthermore, in FIG. 10, a route to a destination has been retrieved, and the charging station 18 at which the vehicle B is to be charged is selected.

Figure 10:
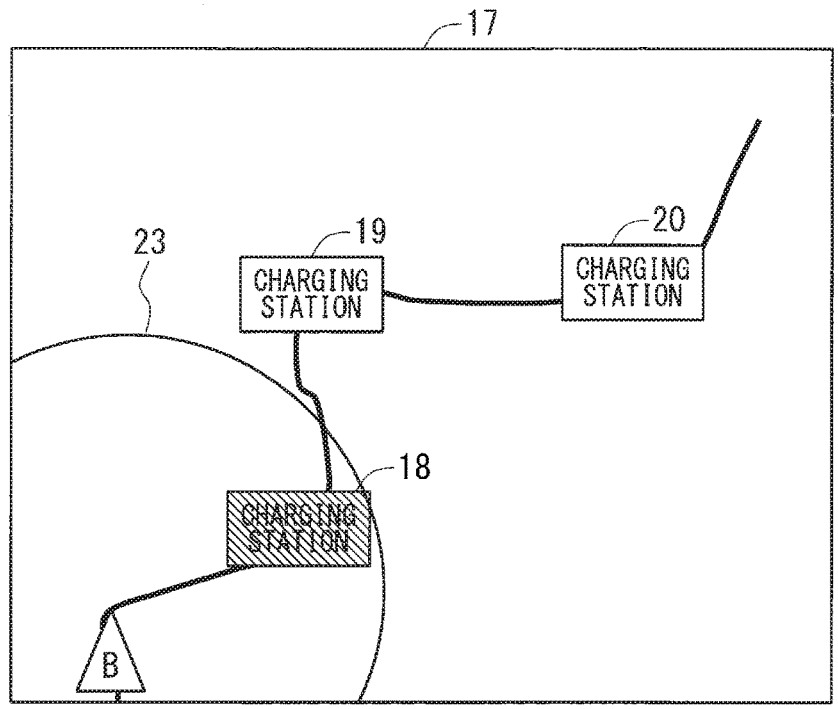
FIG. 10 illustrates a display example in the power transfer apparatus according to Embodiment 1 of the present invention.

As illustrated in FIG. 10, the charging stations 18 to 20 along the route to the destination are displayed on the display 17. The charging station 18 at which the vehicle B is to be charged is highlighted more prominently than the other charging stations 19 and 20. Here, the driver of the vehicle B can easily understand the charging station at which the own vehicle is to be charged. Furthermore, a possible driving range 23 of the vehicle B is displayed on the display 17.

Figure 11:
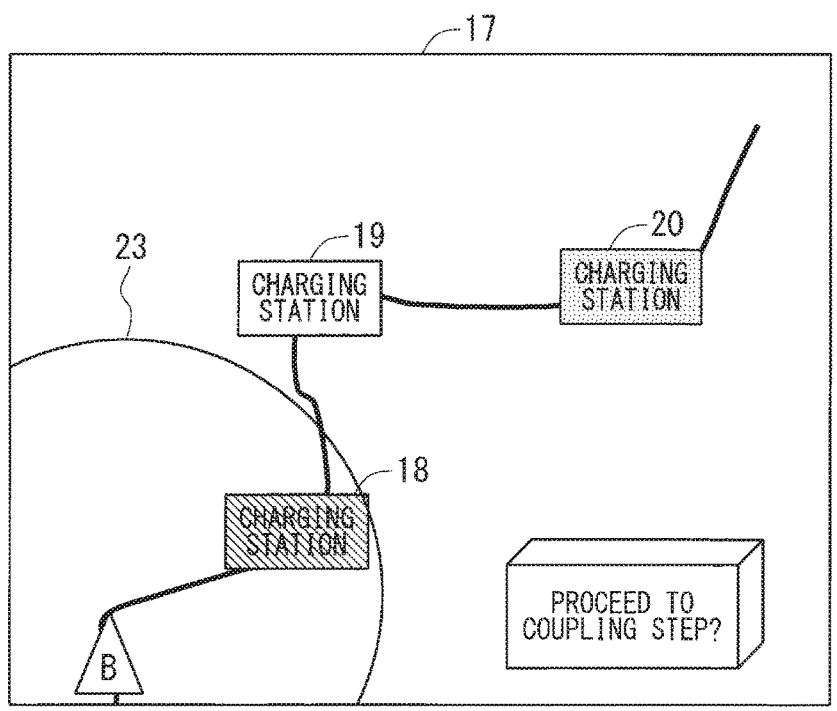
FIG. 11 illustrates a display example in the power transfer apparatus according to Embodiment 1 of the present invention.

Next, when establishing communication with the vehicle A in the display state of FIG. 10 (Yes at the step S104 in FIG. 3), the vehicle B obtains, from the vehicle A, information on the charging station at which the vehicle A is to be charged (charging station 20). Then, the charging station 20 at which the vehicle A is to be charged is highlighted as illustrated in FIG. 11. Here, the driver of the vehicle B can understand the charging station at which the vehicle A is to be charged.

Furthermore, the button indicating "PROCEED TO COUPLING STEP?" is displayed on the display 17 as illustrated in FIG. 11. Upon selection of the button, the display 17 transitions to the one in FIG. 12.

Figure 12:
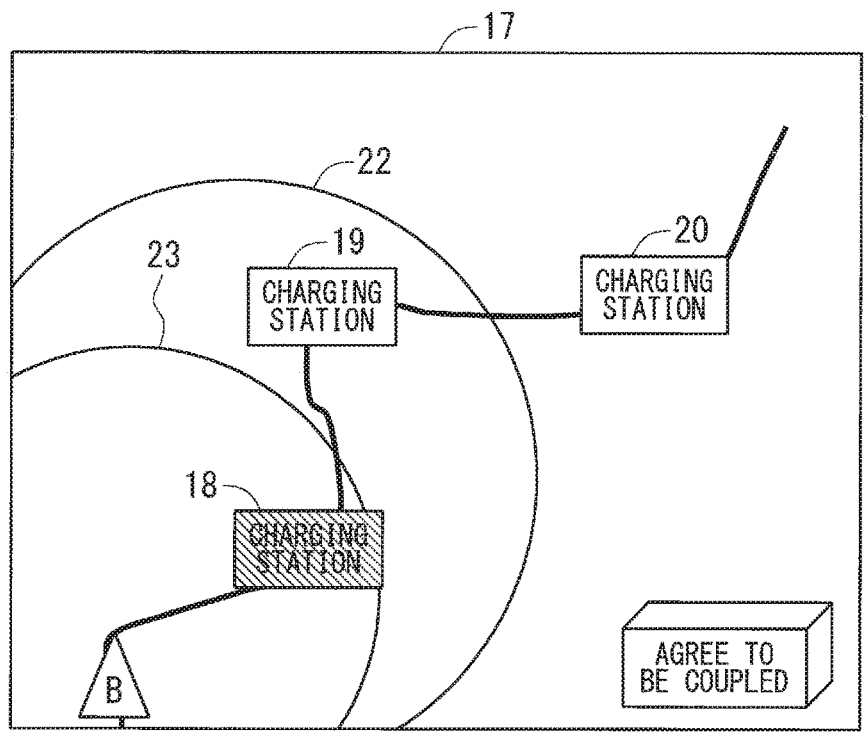
FIG. 12 illustrates a display example in the power transfer apparatus according to Embodiment 1 of the present invention.

As illustrated in FIG. 12, the possible driving range 22 in which both the vehicles A and B can travel as well as the possible driving range 23 of the vehicle B are displayed, and the charging station 18 at which the own vehicle (vehicle B) is to be charged is highlighted on the display 17. Here, the vehicle B obtains, from the vehicle A, information on the possible driving distance of the vehicle A.

Furthermore, a button indicating "AGREE TO BE COUPLED" is displayed on the display 17. Upon selection of the button (Yes at the step S105 in FIG. 3), the display 17 transitions to the one in FIG. 13.

Figure 13:
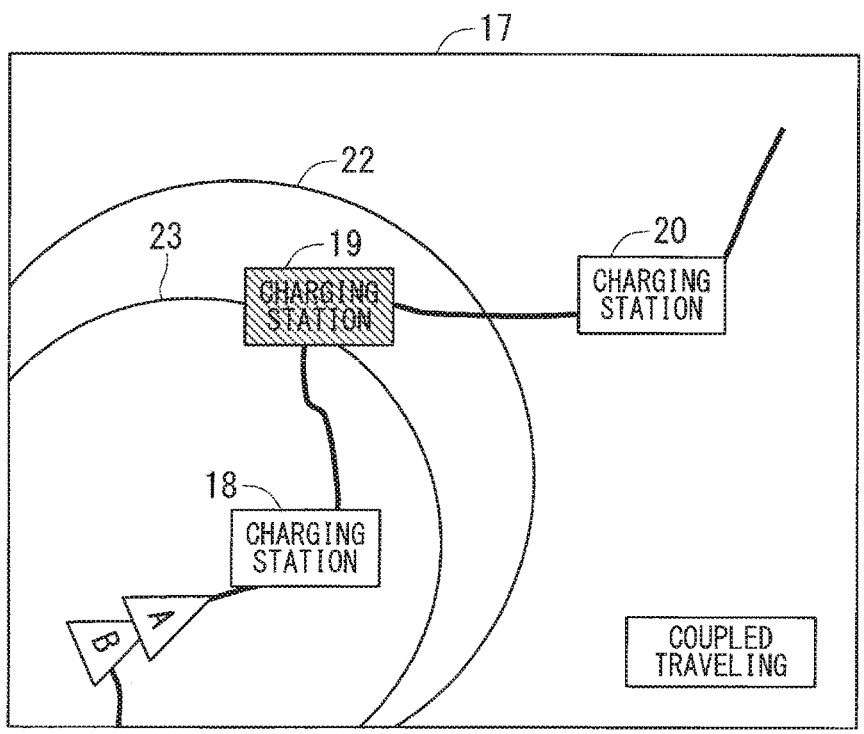
FIG. 13 illustrates a display example in the power transfer apparatus according to Embodiment 1 of the present invention.

As illustrated in FIG. 13, the charging station 19 reselected by the charging station selecting unit 11 is highlighted on the display 17. Furthermore, "COUPLED TRAVELING" indicating that the vehicles. A and B transfer power to each other while they are traveling (i.e., coupled while traveling) is displayed on the display 17.

In FIGS. 8 and 12, the vehicles A and B may be traveling while being coupled, only when both the vehicles A and B select the button indicating "AGREE TO BE COUPLED" or when one of the vehicles A and B selects the button.

Accordingly, the vehicles that travel in a group can transfer power to one another while they are traveling so that the vehicles can be charged at the same charging station according to Embodiment 1. Thus, the vehicles that travel in a group can efficiently transfer power.

Embodiment 2

Embodiment 1 describes that the vehicles that travel in a group each include the group travel controller 9 in FIG. 2 and that the group travel controller 9 in each of the vehicles reselects a charging station. Embodiment 2 of the present invention will describe a case where a representative one of the vehicles that travel in a group performs processes on traveling in the group. Here, the vehicle that performs the processes on traveling in a group is the own vehicle, and the vehicles other than the own vehicle are the other vehicles. Since the power transfer apparatus included in each of the own vehicle and the other vehicles is identical to the power transfer apparatus 4 according to Embodiment 1, the description thereof will be omitted.

Next, operations of the own vehicle including the power transfer apparatus 4 will be described.

FIG. 14 is a flowchart illustrating an example of the operations performed by the power transfer apparatus 4 according to Embodiment 2.

At a step S201, the user sets a destination through the operating unit 16.

At a step S202, the group travel controller 9 calculates a possible driving distance based on the electricity expense and the remaining amount of power in the battery 13.

At a step S203, the group travel controller 9 determines, through the communication unit 5, whether communication with another vehicle has been established. When the group travel controller 9 determines that the communication with the other vehicle has been established, the processes proceed to a step S204. When the group travel controller 9 determines that the communication with the other vehicle has not been established, the processes end.

At the step S204, the group travel controller 9 obtains, from the other vehicle, information on the possible driving distance of the other vehicle.

At a step S205, the group travel controller 9 determines, through the communication unit 5, whether it was agreed to be coupled to the other vehicle. When the group travel controller 9 determines that it was agreed to be coupled to the other vehicle, the processes proceed to a step S206. When the group travel controller 9 determines that it is not agreed to be coupled to the other vehicle, the processes end.

At the step S206, the route search unit 10 searches for a route from a current position (current location) of the own vehicle obtained by the own-vehicle information obtaining unit 7 to a destination set by the user, based on the destination and the current location.

At a step S207, the group travel controller 9 determines whether each of the own vehicle and the other vehicle can reach the destination, based on the possible driving distances of the vehicles. When the group travel controller 9 determines that each of the vehicles can reach the destination, the processes proceed to a step S209. When the group travel controller 9 determines that at least one of the vehicles cannot reach the destination, the processes proceed to a step S208.

At the step S208, the charging station selecting unit 11 selects a charging station based on the route retrieved by the route search unit 10 and the possible driving distances calculated by the group travel controller 9. The information on the charging station may be included in the map information stored in the map information obtaining unit 6 or obtained from an external server through the communication unit 5.

At the step S209, the group travel controller 9 notifies, through the communication unit 5, the other vehicle of information on the route retrieved at the step S206 and information on the charging station selected at the step S208. The group travel controller 9 via the step S207 notifies, through the communication unit 5, the other vehicle only of the information on the route retrieved at the step S206.

Then, the power transfer controller 3 controls the power controller 15 so that the own vehicle and the other vehicle can reach the charging station selected at the step S208. The own vehicle and the other vehicle transfer power to each other while they are traveling up to the charging station. Here, the notified information on the route and the charging station is displayed on the display 17 of the other vehicle (for example, see FIGS. 9 and 13). Thus, the vehicles that travel in a group (the own vehicle and the other vehicle) share the information on the route and the charging station.

Next, another example of the operations of the own vehicle including the power transfer apparatus 4 will be described.

Figure 15:
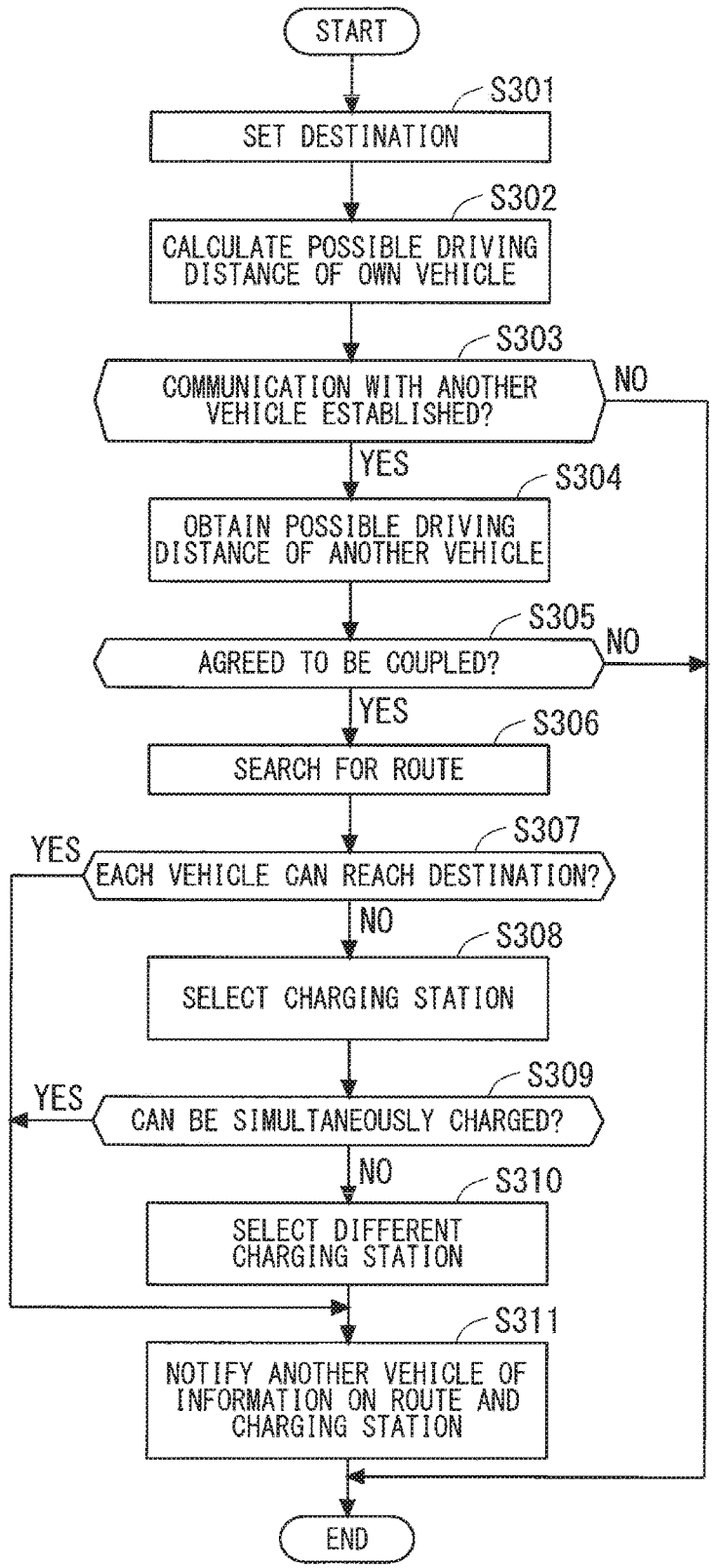
FIG. 15 is a flowchart illustrating an example of the operations performed by the power transfer apparatus according to Embodiment 2 of the present invention.

FIG. 15 is a flowchart illustrating another example of the operations performed by the power transfer apparatus 4 according to Embodiment 2. Since steps S301 to S308 in FIG. 15 correspond to the steps S201 to S208 in FIG. 14, respectively, the description thereof will be omitted.

At a step S309, the group travel controller 9 determines whether the vehicles can be simultaneously charged at the charging station selected at the step S308. When the group travel controller 9 determines that the vehicles can be simultaneously charged, the processes proceed to a step S311. When the group travel controller 9 determines that the vehicles cannot be simultaneously charged, the processes proceed to a step S310.

Specifically, the group travel controller 9 externally obtains, through the information obtaining unit 2, charging station availability information indicating the availabilities of charging stations. Then, the group travel controller 9 determines whether the vehicles can be simultaneously charged at the charging station selected at the step S308, based on the obtained charging station availability information. In other words, the charging station selecting unit 11 can select a charging station at which the vehicles can be simultaneously charged, based on the charging station availability information obtained by the information obtaining unit 2.

At the step S310, the charging station selecting unit 11 select a charging station different from the charging station selected at the step S308. Specifically, the charging station selecting unit 11 selects, based on the charging station availability information obtained by the information obtaining unit 2, a different charging station at which the vehicles can be simultaneously charged, a charging station which is the closest to the vehicles and at which the vehicles are to be charged, or a charging station whose difference in time at which the vehicles start to be charged is as small as possible.

At a step S311, the group travel controller 9 notifies, through the communication unit 5, the other vehicle of information on the route retrieved at the step S306 and information on the charging station selected at the step S308 or S310. The group travel controller 9 via the step S307 notifies, through the communication unit 5, the other vehicle only of the information on the route retrieved at the step S306.

Then, the power transfer controller 3 controls the power controller 15 so that the own vehicle and the other vehicle can reach the charging station selected at the step S308 or S310. The own vehicle and the other vehicle transfer power to each other while they are traveling up to the charging station. Here, the notified information on the route and the charging station is displayed on the display 17 of the other vehicle (for example, see FIGS. 9 and 13). Thus, the vehicles that travel in a group (the own vehicle and the other vehicle) share the information on the route and the charging station.

Since a different charging station is selected when the vehicles cannot be simultaneously charged, the vehicles can travel in a group more efficiently than the operations in FIG. 14.

According to Embodiment 2, even when a representative one of the vehicles that travel in a group performs the processes on traveling in a group, the vehicles can efficiently transfer power therebetween as according to Embodiment 1.

The power transfer apparatus as described above can be applied to in-vehicle navigation apparatuses, namely, not only to car navigation apparatuses but also to portable navigation devices (PNDs) that can be loaded onto vehicles, mobile communication terminals (for example, mobile phones, smartphones, and tablets), navigation apparatuses constructed as systems appropriately combined with servers, and apparatuses other than the navigation apparatuses. The functions or the constituent elements of the power transfer apparatus are dispersively allocated to the functions that construct the system.

Figure 16:
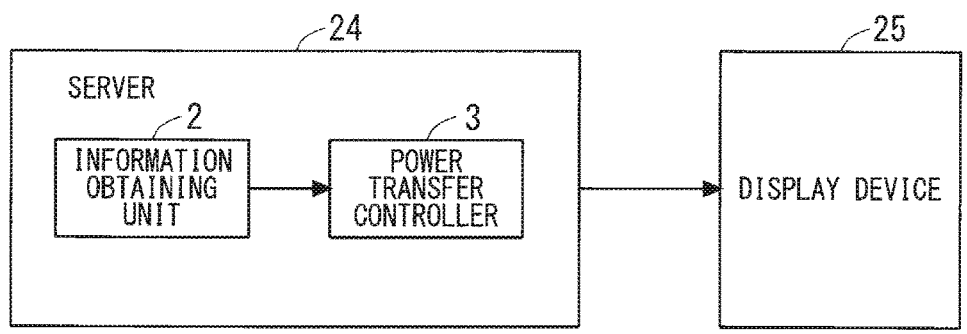
FIG. 16 is a block diagram illustrating an example of a configuration of a power transfer system according to Embodiments of the present invention.

Specifically, the functions of the power transfer apparatus can be, for example, allocated to a server. As illustrated in FIG. 16, for example, a power transfer system can be constructed by including a display device 25 at the user, and at least the information obtaining unit 2 and the power transfer controller 3 in a server 24. The functions of the information obtaining unit 2 and the power transfer controller 3 are the same as those in FIG. 1. Furthermore, the server 24 may include the constituent elements in FIG. 2 as necessary. The constituent elements of the server 24 may be dispersively allocated to the server 24 and the display device 25 as appropriate.

Figure 17:
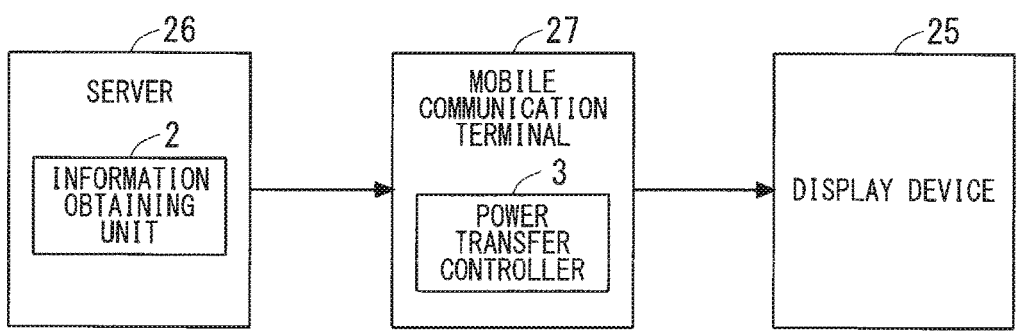
FIG. 17 is a block diagram illustrating another example of a configuration of a power transfer system according to Embodiments of the present invention.

Another example is that the functions of the power transfer apparatus can be allocated to a server and a mobile communication terminal. As illustrated in FIG. 17, for example, a power transfer system can be constructed by including the display device 25 at the user, at least the information obtaining unit 2 in a server 26, and at least the power transfer controller 3 in a mobile communication terminal 27. The functions of the information obtaining unit 2 and the power transfer controller 3 are the same as those in FIG. 1. Furthermore, each of the server 26 and the mobile communication terminal 27 may include the constituent elements in FIG. 2 as necessary. The constituent elements to be included in the server 26 and the mobile communication terminal 27 may be dispersively allocated to the display device 25, the server 26, and the mobile communication terminal 27 as appropriate.

The system even with such a configuration can produce the same advantages as in Embodiments above.

Furthermore, software that executes the operations according to above Embodiments (a power transfer method) may be incorporated in, for example, a server or a mobile communication terminal.

Specifically, in one example, the power transfer method is a power transfer method in a vehicle that can travel on power, the method including: obtaining possible driving distance information indicating a possible driving distance from each of vehicles that travel to a same destination; and controlling, based on the obtained possible driving distance information, transfer of power between a power-surplus vehicle with extra power and a power-shortage vehicle lacking in power so that the vehicles can reach a same charging station, the power-surplus vehicle and the power-shortage vehicle being included in the vehicles.

Accordingly, the software that executes the operations according to above Embodiments can produce the same advantages as above Embodiments, with the software incorporated in a server or a mobile communication terminal and operated.

A central processing unit (CPU) performs programming based on the software to achieve each of the information obtaining unit 2, the power transfer controller 3, the communication unit 5, the own-vehicle position information obtaining unit 7, the controller 8, the group travel controller 9, the route search unit 10, the charging station selecting unit 11, the drive motor 12, the battery 13, the power transfer unit 14, and the power controller 15 in FIGS. 1, 2, 16, and 17. Furthermore, each of the information obtaining unit 2, the power transfer controller 3, the communication unit 5, the own-vehicle position information obtaining unit 7, the controller 8, the group travel controller 9, the route search unit 10, the charging station selecting unit 11, the drive motor 12, the battery 13, the power transfer unit 14, and the power controller 15 may be configured as hardware (for example, arithmetic/processing circuits that perform particular arithmetic computations or processing on an electrical signal) if possible. Furthermore, both of the software and the hardware may be mixed together.

In Embodiments 1 and 2, a charging station is selected based on the premise that the vehicles that travel in a group are at the same position (for example, the current location in FIG. 4). However, it seems that in reality, vehicles frequently start from different places, merge at a predetermined place, and then travel to the same destination. To cope with this situation, the charging station selecting unit 11 may select a charging station before the vehicles merge. Specifically, the charging station selecting unit 11 may select a charging station even in consideration of a distance from the point of departure of each of the vehicles to their merging point.

Embodiments 1 and 2 describe the case where the vehicles that travel in a group, but not necessarily, travel to the same destination. Embodiments 1 and 2 are applicable to even a case, for example, where vehicles travel from the same destination to respective different destinations (e.g., when each of the vehicles returns home). Specifically, the charging station selecting unit 11 can select a charging station, based on a possible driving distance of each of the vehicles, a route until the vehicles branch off, and the amount of power necessary to reach each of the destinations of the vehicles.

Although Embodiments 1 and 2 describe the case where all the vehicles reach a charging station, all of the vehicles may not reach the charging station due to, for example, traffic congestion. To cope with this situation, the power transfer controller 3 controls transfer of power so that a representative one of the vehicles can reach a charging station. The representative vehicle is desirably a vehicle whose possible driving distance is the longest. Here, it is possible to prevent all of the vehicles from exhausting power and stalling.

Embodiments 1 and 2 describe the case where the vehicles that travel in a group are, but are not limited to, EVs driven by motors. The vehicles may include, for example, an EV, and a hybrid vehicle driven by a combination of a motor and an engine. In such a case, the power transfer controller 3 can control supply of power from the hybrid vehicle to the EV, thus extending the possible driving distance of the EV more than by according to Embodiments 1 and 2. Examples of the power supplied from the hybrid vehicle to the EV include the regenerated energy obtained in traveling on gasoline. Furthermore, the charging station selecting unit 11 may select a charging station at which gasoline and power can be received, based on a possible driving distance and a route to a destination of each of the vehicles.

Embodiments of the present invention can be free combined, and appropriately modified and omitted within the scope of the invention.

While the present invention is described in detail above, the foregoing description is in all aspects illustrative and not restrictive. It is understood that numerous modifications that have not yet been described can be devised without departing from the scope of the present disclosure.

DESCRIPTION OF REFERENCE NUMERALS

1 power transfer apparatus, 2 information obtaining unit, 3 power transfer controller, 4 power transfer apparatus, 5 communication unit, 6 map information obtaining unit, 7 own-vehicle position information obtaining unit, 8 controller, 9 group travel controller, 10 route search unit, 11 charging station selecting unit, 12 drive motor, 13 battery, 14 power transfer unit, 15 power controller, 16 operating unit, 17 display, 18 to 20 charging station, 21 to 23 possible driving range, 24 server, 25 display device, 26 server, 27 mobile communication terminal

The invention claimed is:

1. A power transfer system in a vehicle that can travel on power, said system comprising:
   an information obtaining unit that obtains possible driving distance information indicating a possible driving distance of each of vehicles that travel to a same destination;
   a power transfer controller that controls, based on said possible driving distance information obtained by said information obtaining unit, transfer of power between a power-surplus vehicle with extra power and a power-shortage vehicle lacking in power so that said vehicles can reach a same charging station, said power-surplus vehicle and said power-shortage vehicle being included in said vehicles; and
   a charging station selecting unit that selects said same charging station, wherein said charging station selecting unit selects said same charging station, based on said possible driving distance information and a route to said destination,
said information obtaining unit obtains charging station availability information indicating availabilities of charging stations, and
said charging station selecting unit selects a charging station at which said vehicles can be simultaneously charged, based on said charging station availability information obtained by said information obtaining unit.

2. The power transfer system according to claim 1, wherein said power-surplus vehicle supplies said extra power to said power-shortage vehicle while said vehicles are traveling up to said same charging station.

3. The power transfer system according to claim 1, wherein said information obtaining unit obtains said possible driving distance information wirelessly or through wiring.

4. The power transfer system according to claim 1, wherein, when determining that said vehicles cannot be simultaneously charged at said charging station, said charging station selecting unit selects, based on said charging station availability information obtained by said information obtaining unit, (i) a first charging station at which said vehicles can be simultaneously charged or (ii) a second charging station at which said vehicles can be charged in least time, in consideration of a distance to said second charging station and an availability of said second charging station.

5. The power transfer system according to claim 1, wherein said charging station selecting unit selects said same charging station before said vehicles merge.

6. The power transfer system according to claim 1, wherein, when said vehicles travel from said same destination to respective different destinations, said charging station selecting unit selects said same charging station, based on said possible driving distance information, a route until said vehicles branch off, and an amount of power necessary for each of said vehicles to reach a corresponding one of said different destinations.

7. The power transfer system according to claim 1, wherein, when all said vehicles cannot reach said same charging station, said power transfer controller controls transfer of said power so that one of said vehicles can reach said same charging station.

8. The power transfer system according to claim 1, wherein said vehicles include an electric vehicle driven by a motor, and a hybrid vehicle driven by a combination of a motor and an engine, and
said power transfer controller can control supply of said power from said hybrid vehicle to said electric vehicle.

9. The power transfer system according to claim 8, wherein said charging station selecting unit selects said same charging station at which gasoline and power can be received, based on said possible driving distance information and a route to said destination.

10. The power transfer system according to claim 1, wherein each of said vehicles includes a display, and
a screen for agreeing to transfer said power is displayed on said display.

11. The power transfer system according to claim 1, wherein each of said vehicles includes a display, and
a range in which said vehicles can travel while transferring power to one another is displayed on said display.

12. The power transfer system according to claim 1, wherein each of said vehicles includes a display, and
said same charging station is displayed on said display.

13. A method for transferring power in a vehicle that can travel on power, said method comprising:
obtaining possible driving distance information indicating a possible driving distance, from each of vehicles that travel to a same destination;
controlling, based on said obtained possible driving distance information, transfer of power between a power-surplus vehicle with extra power and a power-shortage vehicle lacking in power so that said vehicles can reach a same charging station, said power-surplus vehicle and said power-shortage vehicle being included in said vehicles;
selecting said same charging station; and
obtaining charging station availability information indicating availabilities of charging stations,
wherein said selecting includes:
selecting said same charging station, based on said possible driving distance information and a route to said destination; and
selecting a charging station at which said vehicles can be simultaneously charged, based on said charging station availability information obtained in said obtaining of charging station availability information.

* * * * *